March 24, 1936.	G. P. ECHÉS	2,035,151
GAS PRESSURE REGULATOR
Filed May 16, 1935
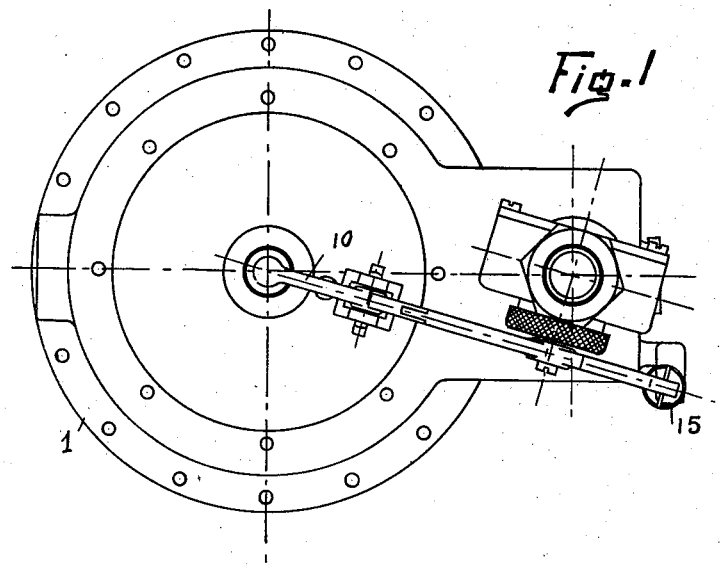
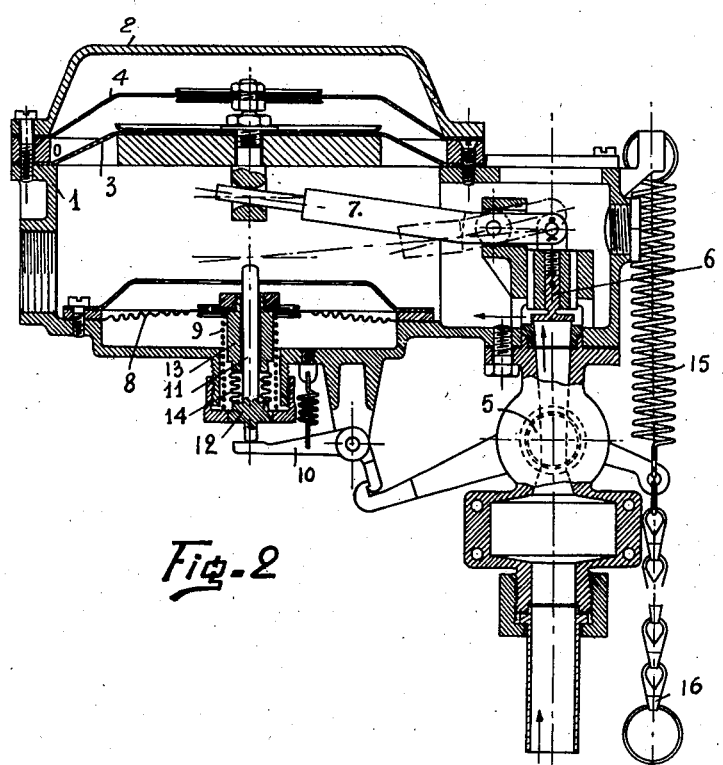
Inventor
Georges Pierre Echés
by Wilkinson & Mawhinney
Attorneys.

Patented Mar. 24, 1936

2,035,151

UNITED STATES PATENT OFFICE 2,035,151

GAS PRESSURE REGULATOR

Georges Pierre Echés, Montrouge, France, assignor to Compagnie pour la Fabrication des Compteurs et Materiel D'Usines a Gaz, Montrouge, France, a joint-stock company of France Application May 16, 1935, Serial No. 21,897
In Germany June 28, 1934

5 Claims. (Cl. 50—5)

The present invention relates to pressure regulators, and more particularly to gas pressure regulators of the kind in which the regulating valve is controlled by means of a diaphragm subjected to the pressure of the gas.

The use of pressure regulators is necessary on the premises of certain consumers when it is required to supply the gas in the piping under increased pressure, or to convey it a long distance, or to compensate for the excessive drop in pressure due to heavy consumption.

Such regulators must in the first place fulfil their main function, viz, that of acting as a reducer, and furthermore must ensure the safety of the consumer.

The object of the present invention is to provide a gas pressure regulator having a safety mechanism which automatically closes the gas supply cock in each of the following cases:

(a) When owing to clogging of the regulating valve, the pressure at the outlet tends to rise above a predetermined maximum value, in particular when the consumer is not using any gas.

(b) When the actuating diaphragm is deteriorated and there is danger of the gas escaping freely on the consumer's premises.

(c) When for any reason, there is no longer a sufficient pressure of gas at the inlet of the regulator.

According to the invention, the regulator has two superposed diaphragms, the lower one of which is operatively connected to the regulating valve and the upper one of which serves as an emergency diaphragm, and said regulator is provided with a safety mechanism comprising a gas inlet cock which is held open by a catch device acting against spring tension, and adapted to be released by a piston which is actuated either by the lower of said two superposed diaphragms, when the pressure of the gas at the inlet falls below a predetermined minimum value, or directly by an auxiliary diaphragm when the pressure of the gas at the outlet exceeds a predetermined maximum value.

The invention will be more readily understood from the ensuing description taken in conjunction with the accompanying drawing, in which:

Fig. 1 is an inverted plan view of an embodiment of the regulator mechanism according to the invention.

Fig. 2 is a sectional front elevation of same.

Referring to Fig. 2, the body 1 of the device is closed by a cover 2. Two superposed diaphragms 3 and 4 are mounted in the upper part of the body 1 and are independent of each other. A gas inlet cock 5, urged towards its closed position by a powerful spring 15, is mounted between the gas supply and the inlet aperture of the body 1, and carries within it a regulating valve 6 which is pivotally connected to the diaphragm 3 by a lever 7. Said diaphragm 3 is loaded so as to give a pressure of about 70 m/m of mercury.

The upper, emergency diaphragm 4 has a central boss which normally rests on the diaphragm 3. Said diaphragm 4 can also be loaded at will to produce, if necessary, an increase of pressure at the outlet; its essential purpose, however, is to serve as a safety cover in the event of the diaphragm 3 becoming accidentally perforated.

The cock 5 is held in the open position by a catch lever 10, which can be set by pulling a chain 16 attached to the operating lug of the cock.

A corrugated diaphragm 8 urged upwardly by an adjustable spring 9, is mounted in the lower part of the body 1. Said diaphragm 8 has a downwardly projecting central boss 13 through which passes freely a piston 11 having a shoulder 12 connected to the boss 13 through the instrumentality of a bellows member 14, the lower end of said piston being arranged to engage with one end of the catch lever 10. The piston 11 can thus effect a small vertical displacement in the boss 13, and release the catch 10 without moving the diaphragm 8. When, however, the diaphragm 8 is displaced downwardly by the pressure within the body 1, the piston 11 will move with it and release the catch 10, thereby permitting the cock 5 to be closed by the spring 15.

The device operates in the following manner:

1.—Normal operation

When there is a drop in pressure at the inlet or an increase of consumption tending to produce a momentary drop of pressure at the outlet, the diaphragms 3 and 4 fall, the valve 6 lifts, and increases the inlet area of the gas; the reverse action takes place when the inlet pressure increases or when the consumption decreases.

Whatever may be the case, the moving members take up a position of equilibrium when the pressure exerted beneath the actuating diaphragm counter-balances its weight, thereby maintaining a constant pressure at the outlet, since such weight itself is constant. This occurs for the normal operation of the regulator.

2.—Safety operation (a) When the consumption has fallen to zero, the diaphragms 3 and 4 are displaced downwardly by their own weight, and the valve 6, which will be firmly pressed on its seat by means of the lever arm 7, should prevent any dangerous rise in the outlet pressure; but if, owing to clogging, it did not correctly fulfill its purpose, the diaphragm 8, loaded for a predetermined maximum pressure, would become operative and release the catch mechanism 10, thereby enabling the gas inlet cock 5 to be closed by the spring 15.

(b) In the event of the actuating diaphragm 3 becoming accidentally perforated, the gas will fill the space between the two diaphragms 3 and 4, whereas the diaphragm 3 will fall by its own weight and open the valve 6, thereby setting up within the body 1 an excess pressure which will displace the diaphragm 8 to release the catch 10 and so cause the cock 5 to close in the manner described above.

(c) When the inlet pressure accidentally falls below a predetermined minimum value, the diaphragm 3 falls and pushes the piston 11 which releases the catch 10 without the diaphragm 8 operating, said diaphragm 8 serving as a bearing surface for the extension of the bellows member 14.

In all these cases the gas can only be turned on again on the consumer's premises after he has reset the catch mechanism by pulling the chain 16.

It will be understood that the foregoing description is given solely by way of example, and in no way limits the invention; the diaphragms could for example have other shapes and be otherwise arranged. Likewise the members actuating the regulating valve and the catch mechanism could be differently constructed, provided that their action produces the same result. Moreover, any modifications of detail could be made in the device described without departing from the scope of the appended claims.

I claim:

1. A pressure regulator comprising in combination, a body member forming a chamber having an inlet aperture and an outlet aperture, a gas inlet control member mounted on the gas supply, resilient means connected to said gas inlet control member and tending to urge same towards its closed position, catch means cooperating with said gas inlet control member to hold same in its open position, pressure regulating means mounted in said chamber and adapted to maintain a constant pressure therein, means adapted to release said catch means when said pressure rises above a predetermined maximum limit, and means adapted to release said catch means when said pressure falls below a predetermined minimum limit.

2. A pressure regulator comprising in combination, a body member forming a chamber having an inlet aperture and an outlet aperture, a gas inlet control member mounted on the gas supply, resilient means connected to said gas inlet control member and tending to urge same towards its closed position, catch means cooperating with said gas inlet control member to hold same in its open position, pressure regulating means mounted in said chamber and adapted to maintain a constant pressure therein, a diaphragm mounted in the lower part of said chamber and adapted to be outwardly displaced by the pressure of the gas within said chamber, means actuated by the outward displacement of said diaphragm to release said catch means when said pressure rises above a predetermined maximum limit, and means actuated by said pressure regulating means to release said catch means when the pressure of gas in said chamber falls below a predetermined minimum limit.

3. A pressure regulator comprising in combination, a body member forming a chamber having an inlet aperture and an outlet aperture, a gas inlet control member mounted on the gas supply, resilient means connected to said inlet control member and tending to urge same towards its closed position, catch means cooperating with said gas inlet control member to hold same in its open position, a loaded diaphragm mounted in the upper part of said chamber and adapted to be outwardly displaced against said load by the pressure of gas in said chamber, a valve mounted in said chamber to control the opening of said inlet aperture, means for operatively connecting said diaphragm to said valve, whereby the outward displacement of said diaphragm tends to close said valve and the inward displacement thereof tends to open said valve, a loaded diaphragm mounted in the lower part of said chamber and adapted to be outwardly displaced against said load by the pressure of the gas within said chamber, means actuated by the outward displacement of said lower diaphragm to release said catch means when said pressure rises above a predetermined maximum limit, and means actuated by the inward displacement of said upper diaphragm to release said catch means when the pressure of gas in said chamber falls below a predetermined minimum limit.

4. A pressure regulator comprising in combination, a body member forming a chamber having an inlet aperture and an outlet aperture, a gas inlet control member mounted on the gas supply, resilient means connected to said inlet control member and tending to urge same towards its closed position, catch means cooperating with said gas inlet control member to hold same in its open position, a loaded diaphragm mounted in the upper part of said chamber and adapted to be outwardly displaced against said load by the pressure of gas in said chamber, a valve mounted in said chamber to control the opening of said inlet aperture, means for operatively connecting said diaphragm to said valve, whereby the outward displacement of said diaphragm tends to close said valve and the inward displacement thereof tends to open said valve, an emergency diaphragm mounted above said upper diaphragm to prevent escape of gas in the event of said upper diaphragm becoming perforated, means adapted to release said catch means when the pressure of gas in said chamber rises above a predetermined maximum limit, and means adapted to release said catch means when said pressure falls below a predetermined minimum limit.

5. A pressure regulator comprising in combination, a body member forming a chamber having an inlet aperture and an outlet aperture, a gas inlet control member mounted between the gas supply and said inlet aperture, resilient means connected to said inlet control member and tending to urge same towards its closed position, catch means cooperating with said gas inlet control member to hold same in its open position, a loaded diaphragm mounted in the upper part of said chamber and adapted to be outwardly displaced against said load by the pressure of gas in said chamber, a valve mounted in said chamber to control the opening of said inlet aperture, means for operatively connecting said diaphragm to said valve, whereby the outward displacement of said diaphragm tends to close said valve and the inward displacement thereof tends to open said valve, a diaphragm mounted in the lower part of said chamber, resilient means between said lower diaphragm and said body member tending to urge said diaphragm inwardly, said diaphragm adapted to be outwardly displaced against said resilient means by the pressure of the gas within said chamber, a sleeve member mounted on said lower diaphragm and projecting downwardly therefrom, a resilient member secured to the lower end of said sleeve member, a piston displaceably mounted in said sleeve member and said resilient member, a shoulder on said piston secured to said resilient member, one end of said piston projecting upwardly into said chamber and the other end thereof engaging said catch means, whereby when the pressure of gas in said chamber rises above a predetermined maximum limit, the outward displacement of said lower diaphragm displaces said piston to release said catch means, and when said pressure falls below a predetermined minimum limit, the inward displacement of said upper diaphragm causes it to push said piston, thereby releasing said catch means.

GEORGES PIERRE ECHÉS.